(12) United States Patent
Jowett et al.

(10) Patent No.: US 8,520,272 B1
(45) Date of Patent: Aug. 27, 2013

(54) SHEET FEEDER HAVING CURVED CALIBRATION STRIP

(75) Inventors: Simon Neil Jowett, Hertfordshire (GB); Richard Thomas Calhoun Bridges, London (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/408,086

(22) Filed: Feb. 29, 2012

(51) Int. Cl.
*H04N 1/04* (2006.01)

(52) U.S. Cl.
USPC ............ 358/496; 358/474; 358/494; 271/264

(58) Field of Classification Search
USPC .......... 358/496, 474, 494, 461, 498; 271/264
See application file for complete search history.

(56) References Cited

U.S. PATENT DOCUMENTS

| | | | |
|---|---|---|---|
| 5,764,384 A | 6/1998 | Wilcox et al. | |
| 5,796,928 A | 8/1998 | Toyomura et al. | |
| 6,032,004 A | 2/2000 | Mirabella, Jr. et al. | |
| 6,536,645 B2 * | 3/2003 | Minakawa | 226/196.1 |
| 6,947,187 B2 | 9/2005 | Mui et al. | |
| 7,457,006 B2 * | 11/2008 | Wilsher et al. | 358/461 |
| 7,755,813 B2 * | 7/2010 | Nishikawa et al. | 358/497 |
| 7,852,528 B2 * | 12/2010 | Lee | 358/498 |
| 7,920,307 B2 * | 4/2011 | Sheng et al. | 358/498 |
| 7,973,985 B2 * | 7/2011 | Tan et al. | 358/496 |
| 2004/0067083 A1 | 4/2004 | Hsu et al. | |
| 2005/0157356 A1 * | 7/2005 | Horaguchi | 358/494 |
| 2006/0268377 A1 | 11/2006 | Haas et al. | |
| 2007/0070457 A1 | 3/2007 | Cheng | |

* cited by examiner

*Primary Examiner* — Kaitlin Joerger
(74) *Attorney, Agent, or Firm* — Gibb & Riley, LLC

(57) ABSTRACT

A sheet feeder apparatus comprises a roller feeding sheets of media in a process direction, and a transparent platen positioned after the roller in the process direction. A scanner is positioned on the scanner side of the transparent platen, and a calibration strip is positioned on the sheet side of the transparent platen. The roller feeds the sheets of media over the sheet side of the transparent platen and the calibration strip. The calibration strip has a curved end surface having outer ends and a center. The center of the curved end surface is between the outer ends of the curved end surface in a cross-process direction. The cross-process direction is perpendicular to the process direction. The center of the curved end surface extends further in the process direction relative to the outer ends of the curved end surface.

16 Claims, 5 Drawing Sheets

SHEET FEEDER HAVING CURVED CALIBRATION STRIP

BACKGROUND

Embodiments herein generally relate to sheet feeders and more particularly to sheet feeders used with scanners and transparent platens that use calibration strips.

Imaging units in sheet feeders can be particularly sensitive to cross process magnification errors caused by variation in the gap between the transparent platen and the sheet throughout the feed. Two distinct errors are sometimes produced. The first occurs as the lead edge of the sheet travels past the scan point and follows the paper path to the exit rolls. The second occurs as the trail edge falls from the calibration strip. The severity of the image quality defects is a combination of both the change in the magnitude of the gap between the sheet and transparent platen and the rate at which the gap changes. The cross process magnification errors manifest themselves most as kinks in straight lines at the inboard or outboard extremities of the sheet.

SUMMARY

An exemplary sheet feeder apparatus presented herein comprises a first drive roller feeding sheets of media in a process direction and a transparent platen positioned after the first drive roller in the process direction. The transparent platen is positioned relative to the first roller to receive the sheets of media from the first roller. The transparent platen has a sheet side and a scanner side, opposite the sheet side. A scanner is positioned on the scanner side of the transparent platen, and a calibration strip is positioned on the sheet side of the transparent platen. The scanner is positioned adjacent the end of the calibration strip, and the scanner can be calibrated by images of the calibration strip obtained through the transparent platen.

The first drive roller feeds the sheets of media over the sheet side of the transparent platen and the calibration strip. The calibration strip has a curved end surface. The center of the curved end surface is between the outer ends of the curved end surface in the cross-process direction (the cross-process direction is perpendicular to the process direction). The center of the curved end surface extends further in the process direction, relative to the outer ends of the curved end surface. More specifically, the curved end surface has a convex shape in the cross-process direction and the outer ends of the calibration strip are positioned closer to the roller, relative to the distance the center of the calibration strip is from the roller. The calibration strip further comprises outer ribs positioned further from the center than the outer ends in the cross-process direction, and the outer ribs also extend toward the processing direction.

This sheet feeder also includes a second drive roller positioned after the transparent platen in the process direction. The second roller is positioned relative to the transparent platen to receive the sheets of media from the transparent platen. An idler roller is positioned between the second drive roller and the transparent platen. Thus, the idler roller contacts the sheets of media as the sheets of media travel from the transparent platen to the second drive roller.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, imaging units in sheet feeders can be particularly sensitive to cross process magnification errors caused by variation in the gap between the transparent platen and the sheet throughout the feed. Cross process magnification errors manifest themselves as kinks in straight lines at the inboard or outboard extremities of the sheet. For example, as shown in the image 160 in FIG. 4, a trail edge defect 162 shows up as a rapid change in the cross process magnification and is most obvious again on a straight border. This defect coincides with the trail edge of the sheet falling from the calibration strip close to the scan point (as shown by the upward arrow in FIG. 3, discussed below). A flat calibration strip allows the entire width of the trail edge (122 in FIG. 3) of the sheet to instantaneously fall onto the platen, which causes a rapid change in cross process magnification at the scan point. Even though the calibration strip can be very thin (e.g., 0.3 mm) this error can continue to occur in highly sensitive systems.

Figure 3:
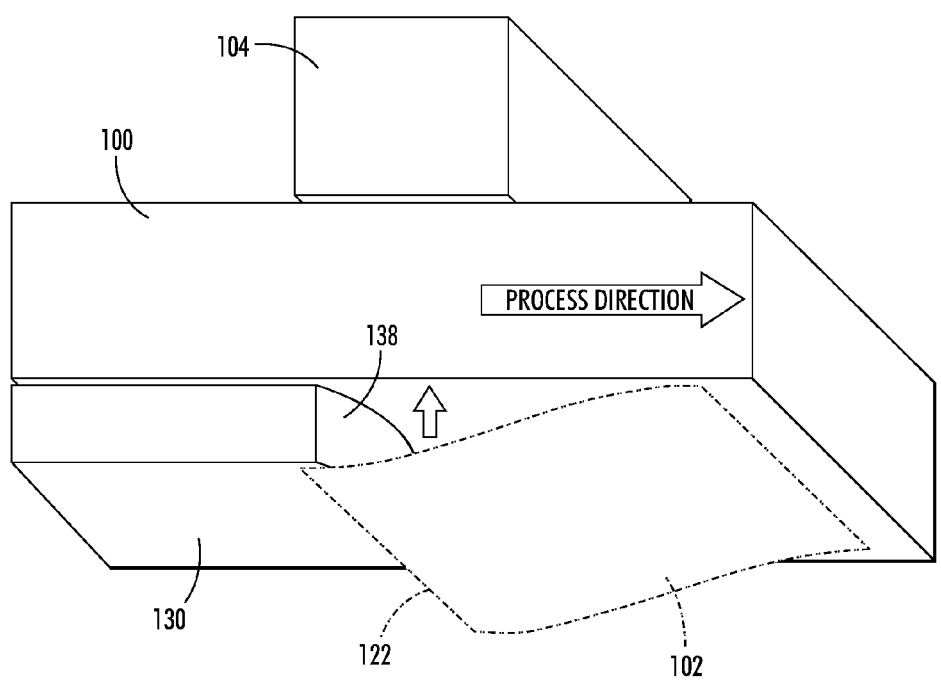
FIG. 3 is a perspective-view cross-processing direction cross-sectional schematic diagram of a device according to embodiments herein.
Figure 4:
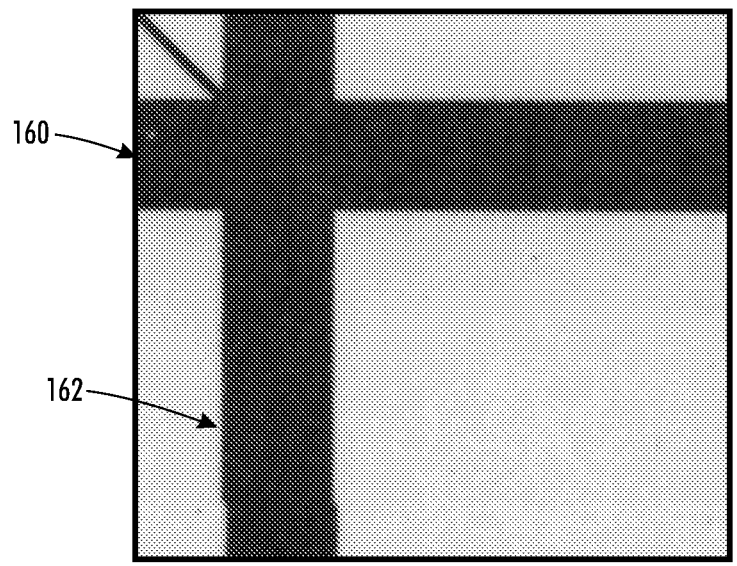
FIG. 4 is an image of an image quality defect according to embodiments herein.
Figure 5:
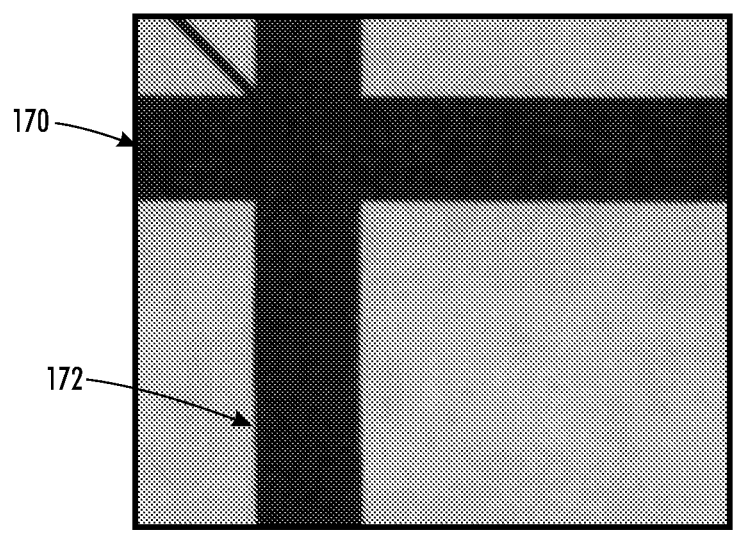
FIG. 5 is an image without an image quality defect according to embodiments herein.

In view of these issues, this disclosure presents a structure that allows the extremities of the sheet (inboard and outboard edges of the sheet) to be gradually released onto the platen as the trail edge travels over the calibration strip and at a point further away from the scan point by using a calibration strip that has a curved end (as shown by item 138 in FIG. 3). This design uses the beam strength of the sheet to ensure that, as the centre of the sheet is still supported, the extremities are lowered onto the glass in a way that has less of an effect on the gap at the scan point (and this reduces or eliminates the trail edge defect 162, as shown by the lack of a defect 172 in FIG. 5).

Figure 1:
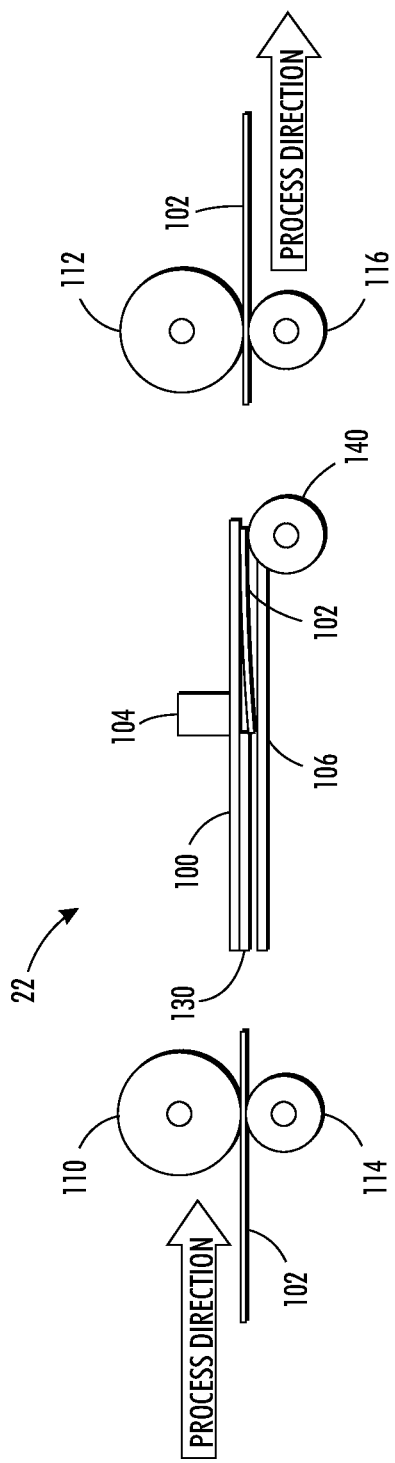
FIG. 1 is a processing direction cross-sectional schematic diagram of a device according to embodiments herein.
Figure 2:
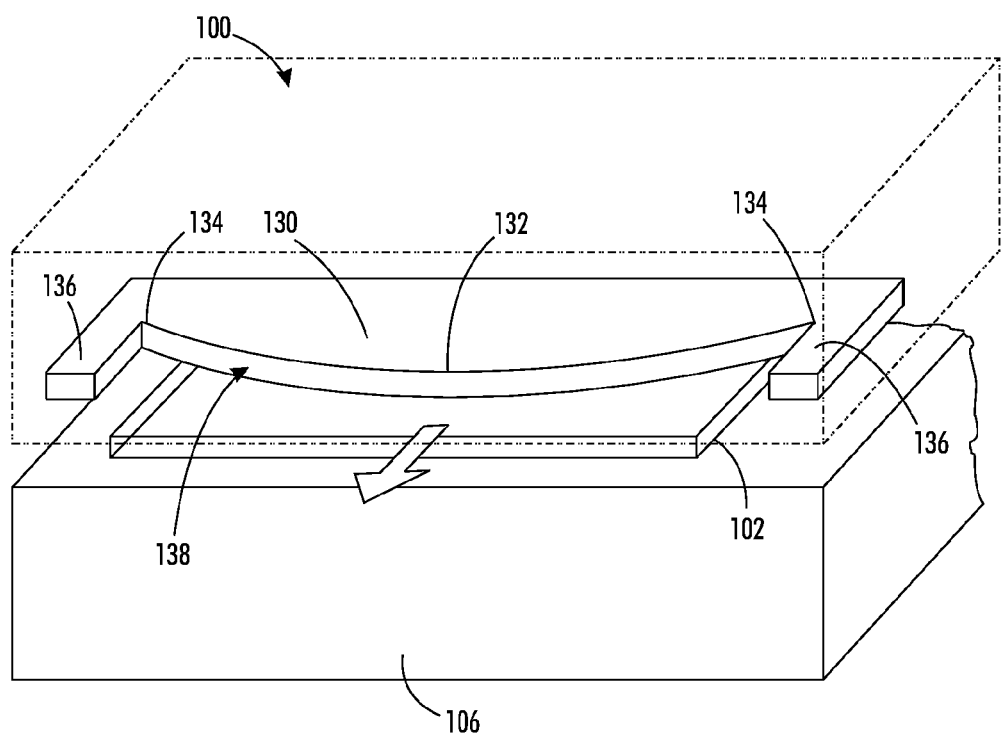
FIG. 2 is a perspective-view cross-processing direction cross-sectional schematic diagram of a device according to embodiments herein.

More specifically, as shown in FIGS. 1-3, an exemplary sheet feeder apparatus 22 presented herein comprises a first drive roller 110 and opposing bias roller 114 feeding sheets 102 of media in a process direction (indicated by the block arrow) and a transparent platen 100 (which can be glass, transparent plastic, transparent ceramic, etc.) positioned after the first drive roller 110 in the process direction. The transparent platen 100 is positioned relative to the first drive roller 110 to receive the sheets 102 of media from the first roller. The transparent platen 100 has a sheet side and a scanner side, opposite the sheet side. A scanner 104 (which can be any form of light sensing device, such as a full with array (FWA) of light sensors, etc.) is positioned on the scanner 104 side of the transparent platen 100, and a calibration strip 130 (which can be any material of suitable reflectivity, such as BoPET (Bi-axially-oriented polyethylene terephthalate), polymers, polyesters, metals, glasses, ceramics, etc.)) is positioned on the sheet side of the transparent platen 100. An opposing guide 106 (which can be formed from any of the preceding materials) is spaced from the calibration strip 130 and the sheet passes between the calibration strip 130 and the opposing guide 106.

As shown in FIGS. 1 and 3, the first drive roller 110 feeds the sheets 102 of media over the sheet side of the transparent platen 100 and the calibration strip 130. As shown in the perspective-view schematic diagram in FIG. 2, the calibration strip 130 has a curved end surface 138. The center 132 of the curved end surface 138 is between the outer ends 134 of the curved end surface 138 in the cross-process direction. The cross-process direction is perpendicular to the process direction. Again, the process direction is shown by the block arrows in FIGS. 1-3.

As shown in FIG. 2, the center 132 of the curved end surface 138 extends further in the process direction, than the outer ends 134 (inboard and outboard ends 134) of the curved end surface 138. Note that in FIG. 2, the platen 100 is shown in transparent form to allow the other features to be observed more easily.

More specifically, the curved end surface 138 has a convex shape in the cross-process direction, as shown in FIG. 2. The outer ends 134 of the calibration strip 130 are therefore positioned closer to the roller 100, relative to the distance the center 132 of the calibration strip is from the roller 100. The calibration strip 130 can further comprise outer ribs 136 positioned further from the center 132 than the outer ends 134 in the cross-process direction, and the outer ribs 136 extends further in the process direction, than the outer ends 134.

This sheet feeder 22 also includes a second drive roller 112 and opposing bias roller 116 positioned after the transparent platen 100 in the process direction. The second drive roller 112 is positioned relative to the transparent platen 100 to receive the sheets 102 of media from the transparent platen 100. An idler roller 140 is positioned at the end of the opposing calibration strip 106, between the second drive roller 112 and the transparent platen 100. Thus, the idler roller 140 contacts the sheets 102 of media as the sheets 102 of media travel from the transparent platen 100 to the second drive roller 112.

Thus, as shown in FIG. 2, the design of the calibration strip 130 is negatively scalloped in order to release the extremities of the sheet 102 slowly onto the transparent platen 100 rather than allowing the trail edge of the sheet 102 to flick suddenly from the calibration strip 130 in the direction shown by the upward arrow in FIG. 3. Note that FIG. 3 is a bottom-up perspective view from beneath the platen 100, relative to the top-down perspective view shown in FIG. 2.

The calibration strip 130 can be, for example, cut from a flat, thin sheet of BoPET (0.2 mm thin) and is adhered to the platen 100. Together the calibration strip 130 and the platen 100 form the upper portion of the paper path (see FIG. 1). The sheet 102 passes by the calibration strip 130, but due to the geometry of the exit path, the sheet 102 presses against the calibration strip 130 and platen 100. As the trail edge 122 of the sheet 102 travels past the ending edge of the calibration strip 130 in the process direction, the trail edge 122 of the sheet 102 can flick onto the platen 100, in the direction shown by the upward arrow in FIG. 3. This sheet movement can cause a rapid change in the gap between the sheet 102 and platen 100 at the imaging point (note that the scanner 104 is positioned at the end of the calibration strip 130) and this sheet movement can cause image quality defects. The curved shape of the end 138 of the calibration strip 130 is designed to ensure that the extremities of the sheet 102 (inboard and outboard edges of the sheet 102, in the cross-process direction) are released onto the platen 100 in a more controlled fashion and while the center of the sheet 102 is still in contact with, and supported by the calibration strip 130 due to the curved design. Therefore, the curved shape of the end 138 of the calibration strip 130 causes the inboard and outboard edges of the trailing end 122 of the sheet 102 to move toward the platen 100 before the center of the sheet 102 moves toward the platen 100, thereby making the movement of the trailing end 122 of the sheet 102 toward the platen 100 more gentle and reducing the rapid change in cross process magnification at the scan point (which reduces or eliminates the trail edge defect 162 in item 160 shown in FIG. 4, as shown by the lack of a defect 172 in item 170 in FIG. 5).

This curved calibration strip 130 can be assisted by the support provided by an idler roller 140 that is placed after the scan point at such a point that it supports the sheet 102 and positively biases the sheet 102 against the transparent platen 100 (as shown in FIG. 1). The positive biasing of the sheet 102 against the transparent platen 100 by the idler roller 140 helps make the curved calibration strip 130 solution more robust because the idler roller 140 causes the sheet 102 position and angle to be more controlled at the scan point when the trail edge 122 begins to transition from the calibration strip 130. The positive bias produced by the idler roller 140 also works to alleviate the effect of positional tolerances of the constituent parts of the design. Thus, the combination of the calibration strip 130 and the idler roller 140 work together to reduce the severity of the trailing edge defects and to make the design more robust to mechanical tolerances and noises (such as media weight, curl etc.).

Figure 6:
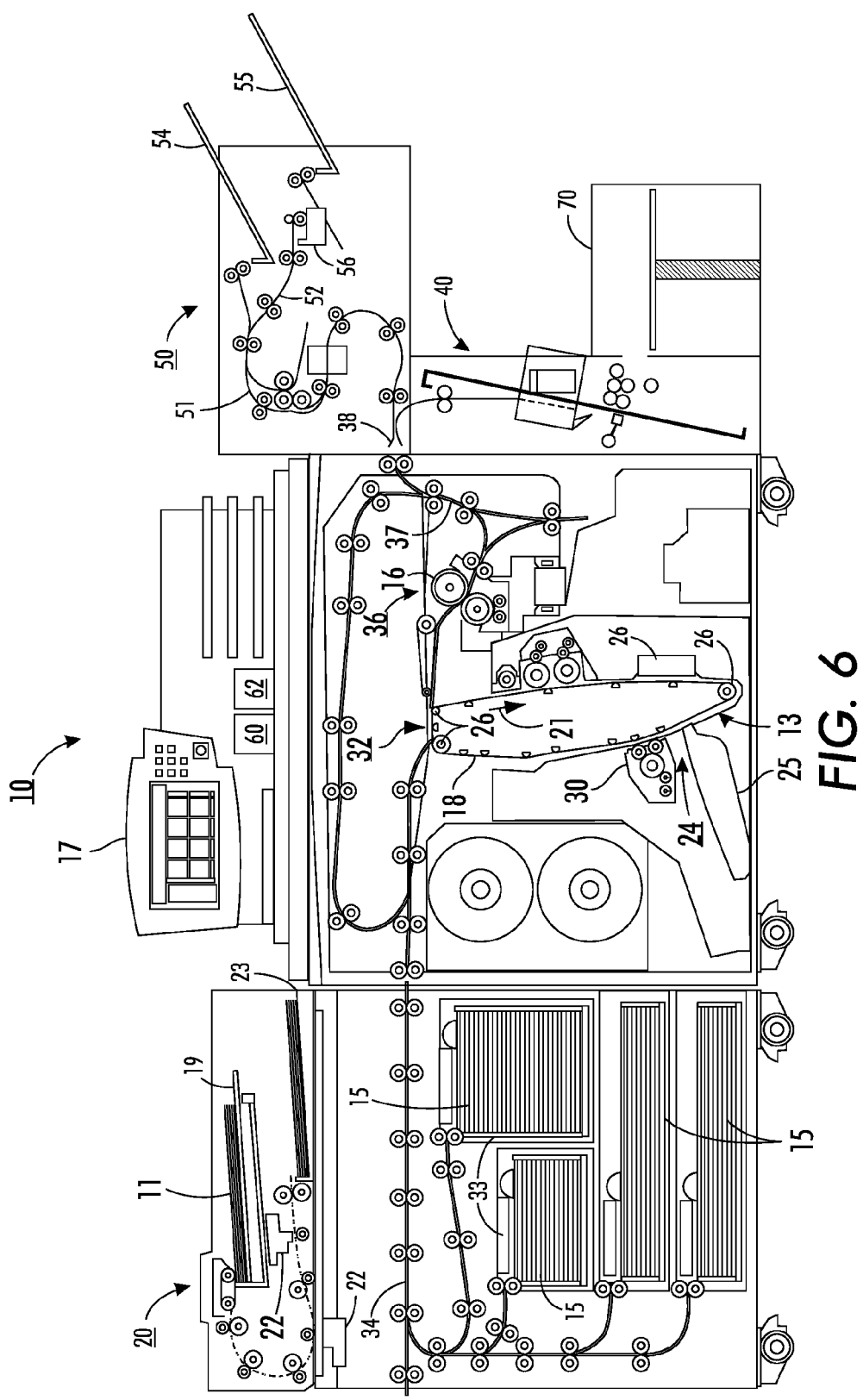
FIG. 6 is a processing direction cross-sectional schematic diagram of a device according to embodiments herein.

Referring to the FIG. 6 a printing machine 10 is shown that includes an automatic document feeder 20 (ADF) that can be used to scan (at a scanning station 22) original documents 11 fed from a tray 19 to a tray 23. The user may enter the desired printing and finishing instructions through the graphic user interface (GUI) or control panel 17, or use a job ticket, an electronic print job description from a remote source, etc. The control panel 17 can include one or more processors 60, power supplies, as well as storage devices 62 storing programs of instructions that are readable by the processors 60 for performing the various functions described herein. The storage devices 62 can comprise, for example, non-volatile storage mediums including magnetic devices, optical devices, capacitor-based devices, etc.

An electronic or optical image or an image of an original document or set of documents to be reproduced may be projected or scanned onto a charged surface 13 or a photoreceptor belt 18 to form an electrostatic latent image. The belt photoreceptor 18 here is mounted on a set of rollers 26. At least one of the rollers is driven to move the photoreceptor in the direction indicated by arrow 21 past the various other known electrostatic processing stations including a charging station 28, imaging station 24 (for a raster scan laser system 25), developing station 30, and transfer station 32.

Thus, the latent image is developed with developing material to form a toner image corresponding to the latent image. More specifically, a sheet 15 is fed from a selected paper tray supply 33 to a sheet transport 34 for travel to the transfer station 32. There, the toned image is electrostatically transferred to a final print media material 15, to which it may be permanently fixed by a fusing device 16. The sheet is stripped from the photoreceptor 18 and conveyed to a fusing station 36 having fusing device 16 where the toner image is fused to the sheet. A guide can be applied to the substrate 15 to lead it away from the fuser roll. After separating from the fuser roll, the substrate 15 is then transported by a sheet output transport 37 to output trays a multi-function finishing station 50.

Printed sheets 15 from the printer 10 can be accepted at an entry port 38 and directed to multiple paths and output trays 54, 55 for printed sheets, corresponding to different desired actions, such as stapling, hole-punching and C or Z-folding. The finisher 50 can also optionally include, for example, a modular booklet maker 40 although those ordinarily skilled in the art would understand that the finisher 50 could comprise any functional unit, and that the modular booklet maker 40 is merely shown as one example. The finished booklets are collected in a stacker 70. It is to be understood that various rollers and other devices which contact and handle sheets within finisher module 50 are driven by various motors, solenoids and other electromechanical devices (not shown), under a control system, such as including the microprocessor 60 of the control panel 17 or elsewhere, in a manner generally familiar in the art.

Thus, the multi-functional finisher 50 has a top tray 54 and a main tray 55 and a folding and booklet making section 40 that adds stapled and unstapled booklet making, and single sheet C-fold and Z-fold capabilities. The top tray 54 is used as a purge destination, as well as, a destination for the simplest of jobs that require no finishing and no collated stacking. The main tray 55 can have, for example, a pair of pass-through sheet upside down staplers 56 and is used for most jobs that require stacking or stapling.

As would be understood by those ordinarily skilled in the art, the printing device 10 shown in FIG. 6 is only one example and the embodiments herein are equally applicable to other types of printing devices that may include fewer components or more components. For example, while a limited number of printing engines and paper paths are illustrated in FIG. 6, those ordinarily skilled in the art would understand that many more paper paths and additional printing engines could be included within any printing device used with embodiments herein.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A sheet feeder apparatus comprising:
a roller feeding sheets of media in a process direction;
a transparent platen positioned after said roller in said process direction, said transparent platen being positioned relative to said roller to receive said sheets of media from said roller, said transparent platen having a sheet side and a scanner side, opposite said sheet side;
a scanner positioned on said scanner side of said transparent platen; and
a calibration strip positioned on said sheet side of said transparent platen,
said scanner obtaining images of said calibration strip through said transparent platen during calibration of said scanner,
said roller feeding said sheets of media over said sheet side of said transparent platen and said calibration strip,
said calibration strip having a curved end surface having outer ends and a center,
said center of said curved end surface being between said outer ends of said curved end surface in a cross-process direction,
said cross-process direction being perpendicular to said process direction, and
said center of said curved end surface extending further in said process direction relative to said outer ends of said curved end surface.

2. The sheet feeder apparatus according to claim 1, said outer ends of said calibration strip being positioned closer to said roller, relative to a distance said center of said calibration strip is from said roller.

3. The sheet feeder apparatus according to claim 1, said curved end surface having a convex shape in said cross-process direction.

4. The sheet feeder apparatus according to claim 1, said calibration strip further comprising outer ribs positioned further from said center than said outer ends in said cross-process direction, said outer ribs extending toward said processing direction.

5. A sheet feeder apparatus comprising:
a drive roller feeding sheets of media in a process direction;
a transparent platen positioned after said drive roller in said process direction, said transparent platen being positioned relative to said drive roller to receive said sheets of media from said drive roller, said transparent platen having a sheet side and a scanner side, opposite said sheet side;

an idler roller positioned after said transparent platen in said process direction, said idler roller contacting said sheets of media as said sheets of media travel from said transparent platen;

a scanner positioned on said scanner side of said transparent platen; and a calibration strip positioned on said sheet side of said transparent platen, said scanner obtaining images of said calibration strip through said transparent platen during calibration of said scanner, said drive roller feeding said sheets of media over said sheet side of said transparent platen and said calibration strip, said calibration strip having a curved end surface having outer ends and a center, said center of said curved end surface being between said outer ends of said curved end surface in a cross-process direction, said cross-process direction being perpendicular to said process direction, and said center of said curved end surface extending further in said process direction relative to said outer ends of said curved end surface.

6. The sheet feeder apparatus according to claim 5, said outer ends of said calibration strip being positioned closer to said roller, relative to a distance said center of said calibration strip is from said roller.

7. The sheet feeder apparatus according to claim 5, said curved end surface having a convex shape in said cross-process direction.

8. The sheet feeder apparatus according to claim 5, said calibration strip further comprising outer ribs positioned further from said center relative to said outer ends in said cross-process direction, said outer ribs extending toward said processing direction.

9. A sheet feeder apparatus comprising:

a first drive roller feeding sheets of media in a process direction;

a transparent platen positioned after said first drive roller in said process direction, said transparent platen being positioned relative to said first drive roller to receive said sheets of media from said first drive roller, said transparent platen having a sheet side and a scanner side, opposite said sheet side;

a second drive roller positioned after said transparent platen in said process direction, said second drive roller being positioned relative to said transparent platen to receive said sheets of media from said transparent platen;

an idler roller positioned between said second drive roller and said transparent platen, said idler roller contacting said sheets of media as said sheets of media travel from said transparent platen to said second drive roller;

a scanner positioned on said scanner side of said transparent platen; and a calibration strip positioned on said sheet side of said transparent platen, said scanner obtaining images of said calibration strip through said transparent platen during calibration of said scanner, said first drive roller feeding said sheets of media over said sheet side of said transparent platen and said calibration strip, said calibration strip having a curved end surface having outer ends and a center, said center of said curved end surface being between said outer ends of said curved end surface in a cross-process direction, said cross-process direction being perpendicular to said process direction, and said center of said curved end surface extending further in said process direction relative to said outer ends of said curved end surface.

10. The sheet feeder apparatus according to claim 9, said outer ends of said calibration strip being positioned closer to said roller, relative to a distance said center of said calibration strip is from said roller.

11. The sheet feeder apparatus according to claim 9, said curved end surface having a convex shape in said cross-process direction.

12. The sheet feeder apparatus according to claim 9, said calibration strip further comprising outer ribs positioned further from said center relative to said outer ends in said cross-process direction, said outer ribs extending toward said processing direction.

13. A printer apparatus comprising:

a roller feeding sheets of media in a process direction;

a transparent platen positioned after said roller in said process direction, said transparent platen being positioned relative to said roller to receive said sheets of media from said roller, said transparent platen having a sheet side and a scanner side, opposite said sheet side;

a scanner positioned on said scanner side of said transparent platen;

a calibration strip positioned on said sheet side of said transparent platen, said scanner obtaining images of said calibration strip through said transparent platen during calibration of said scanner, said roller feeding said sheets of media over said sheet side of said transparent platen and said calibration strip, said calibration strip having a curved end surface having outer ends and a center, said center of said curved end surface being between said outer ends of said curved end surface in a cross-process direction, said cross-process direction being perpendicular to said process direction, and said center of said curved end surface extending further in said process direction relative to said outer ends of said curved end surface; and a printing engine operatively connected to said scanner, said printing engine printing images captured by said scanner.

14. The printer apparatus according to claim 13, said outer ends of said calibration strip being positioned closer to said roller, relative to a distance said center of said calibration strip is from said roller.

15. The printer apparatus according to claim 13, said curved end surface having a convex shape in said cross-process direction.

16. The printer apparatus according to claim 13, said calibration strip further comprising outer ribs positioned further from said center relative to said outer ends in said cross-process direction, said outer ribs extending toward said processing direction.

* * * * *